April 4, 1933.  J. G. CONNOR  1,903,371
MECHANICAL FIGURE
Filed May 18, 1931    6 Sheets-Sheet 3

INVENTOR,
James G. Connor.
BY
ATTORNEYS

April 4, 1933.  J. G. CONNOR  1,903,371
MECHANICAL FIGURE
Filed May 18, 1931  6 Sheets-Sheet 4
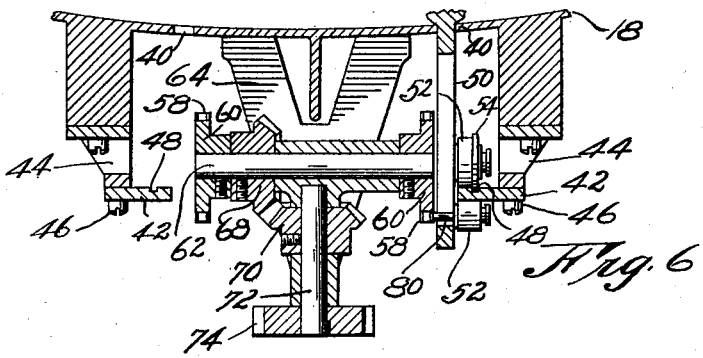
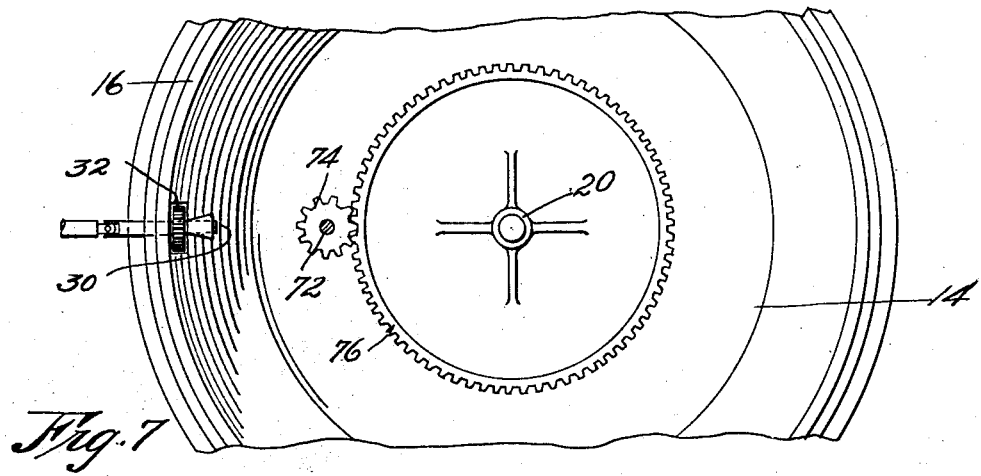
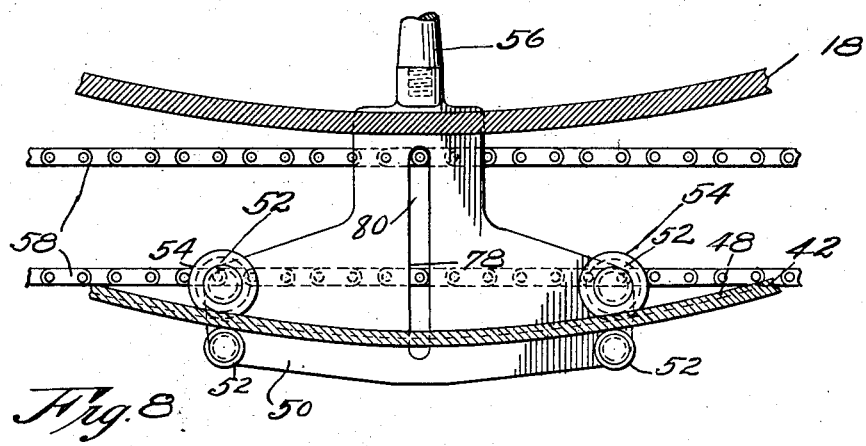
INVENTOR,
James G. Connor.
BY
Hovey & Hamilton,
ATTORNEYS.

April 4, 1933.  J. G. CONNOR  1,903,371
MECHANICAL FIGURE
Filed May 18, 1931   6 Sheets-Sheet 5
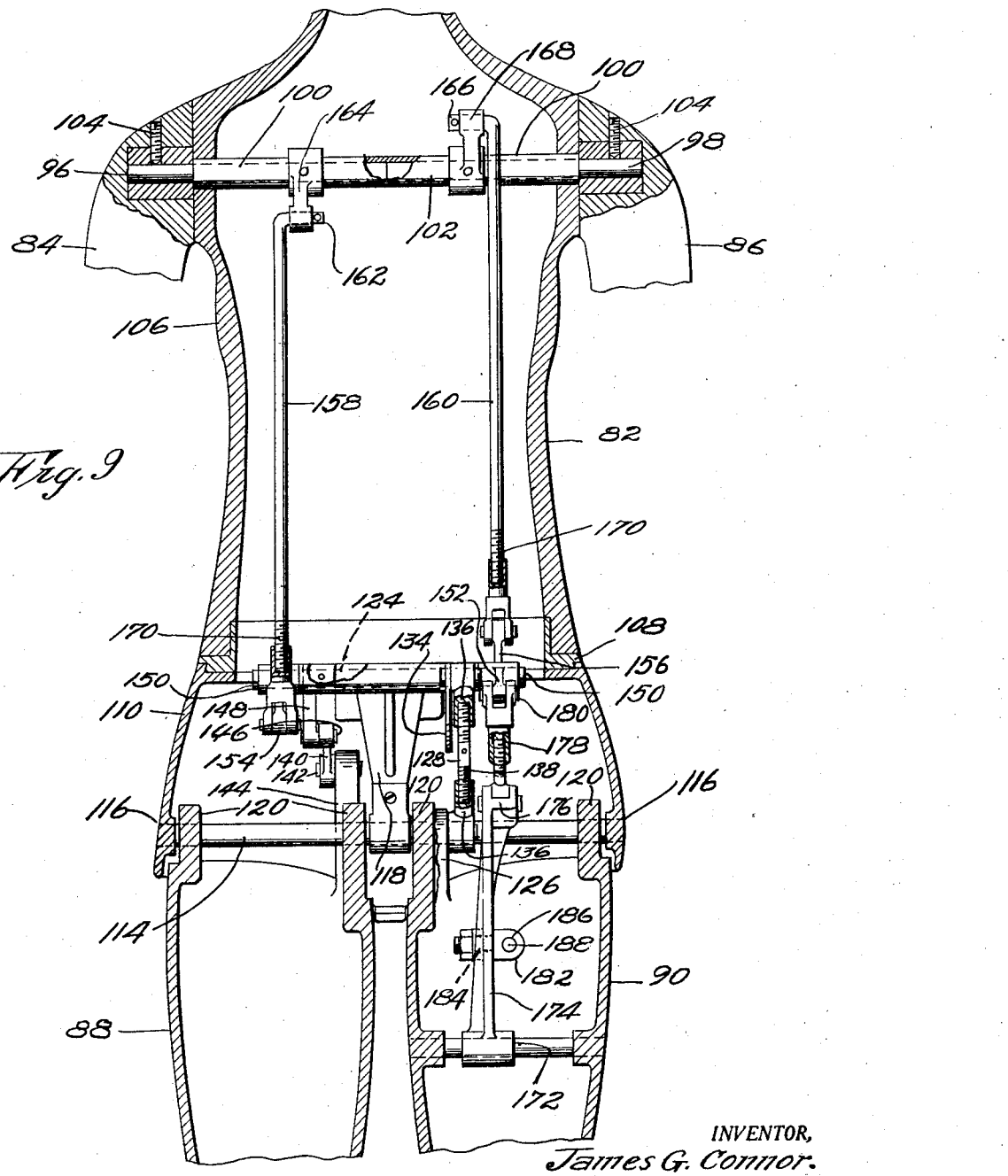
Fig. 9
INVENTOR,
James G. Connor.
BY
ATTORNEYS.

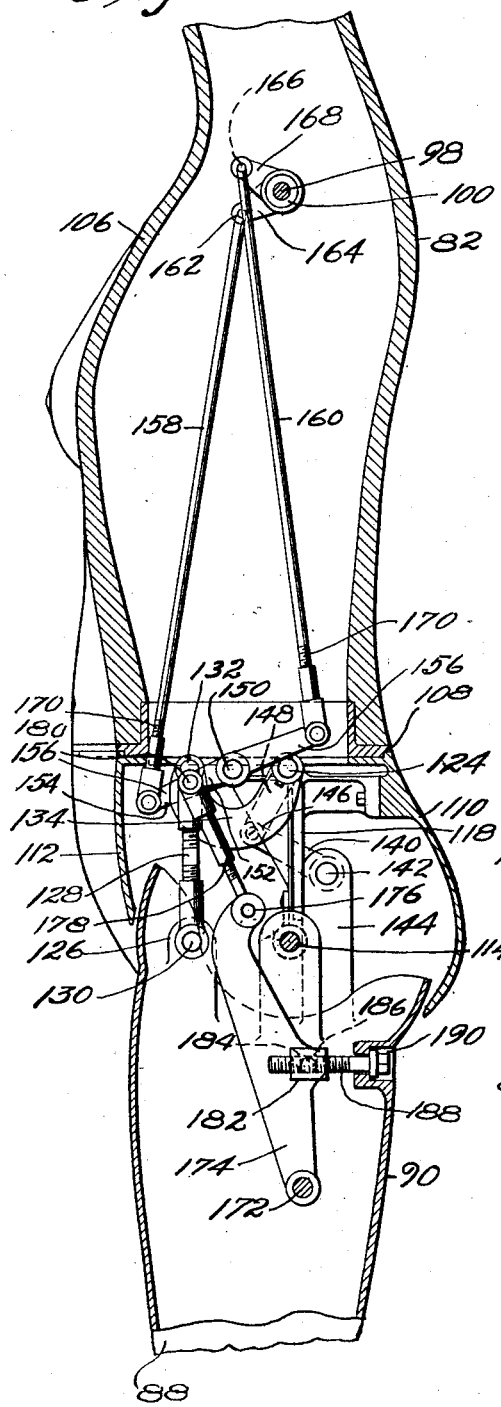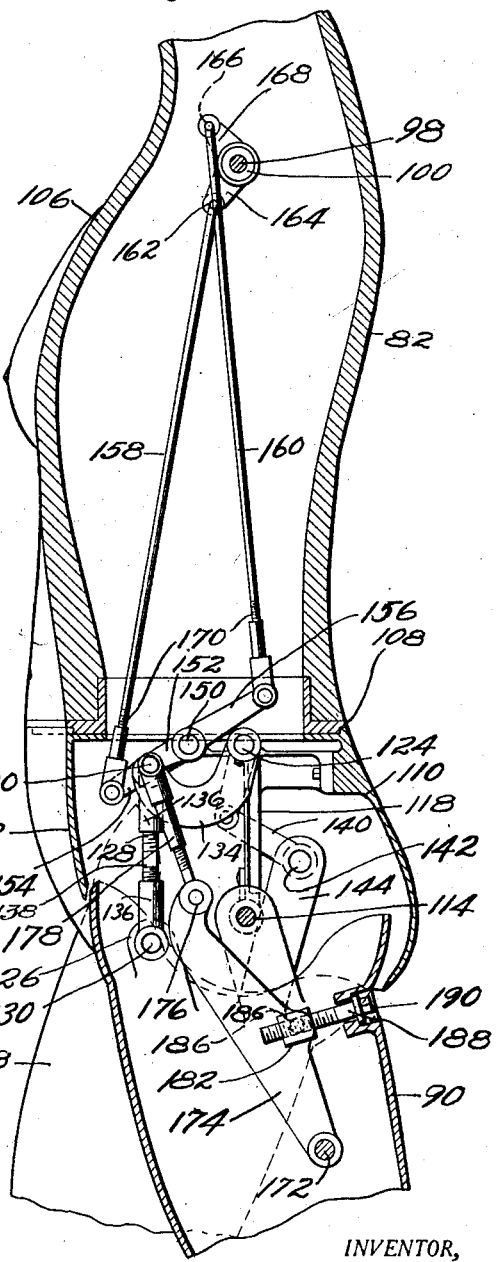

Patented Apr. 4, 1933

1,903,371

UNITED STATES PATENT OFFICE

JAMES G. CONNOR, OF KANSAS CITY, KANSAS, ASSIGNOR TO THE ANIMATED ROBOQUIN DISPLAY COMPANY, A CORPORATION OF MISSOURI

MECHANICAL FIGURE

Application filed May 18, 1931. Serial No. 538,114.

This invention relates to mechanical figures and particularly to mechanical figures adapted to be rotated as the limbs thereof are operated to simulate to a limited degree the natural movements of the animal represented, and is an improvement on an invention disclosed in application for United States Patent Serial Number 511,619, filed by me on January 27, 1931.

The principal object of this invention is the provision of a mechanical figure that is simple and durable in construction, easily adjustable to vary the relative movements of the parts, and having its moving parts so constructed as to eliminate to a large degree undesirable lost motions.

Another object of the present invention is the provision of a specially constructed turntable having novelly constructed means for oscillating the legs of the figure.

A further object of this invention is the provision of means for affecting proper and predetermined relative movements of the respective parts of the figure.

Other objects of this invention will appear during the course of the specification, referring to the accompanying drawings, in which:

Fig. 6 is an enlarged vertical sectional view taken on line VI—VI of Fig. 4.

Fig. 7 is a fragmentary plan view of a portion of the base.

Fig. 8 is an enlarged view of the carriage and some of its associated parts.

Fig. 9 is an enlarged front elevation of a portion of the figure partly broken to show the operating mechanism in elevation.

Fig. 10 is an enlarged fragmentary side elevation of the figure partly broken away to show the operating mechanism in elevation.

Fig. 11 is a view similar to that shown in Fig. 10, with the parts moved to other positions.

Figure 1:
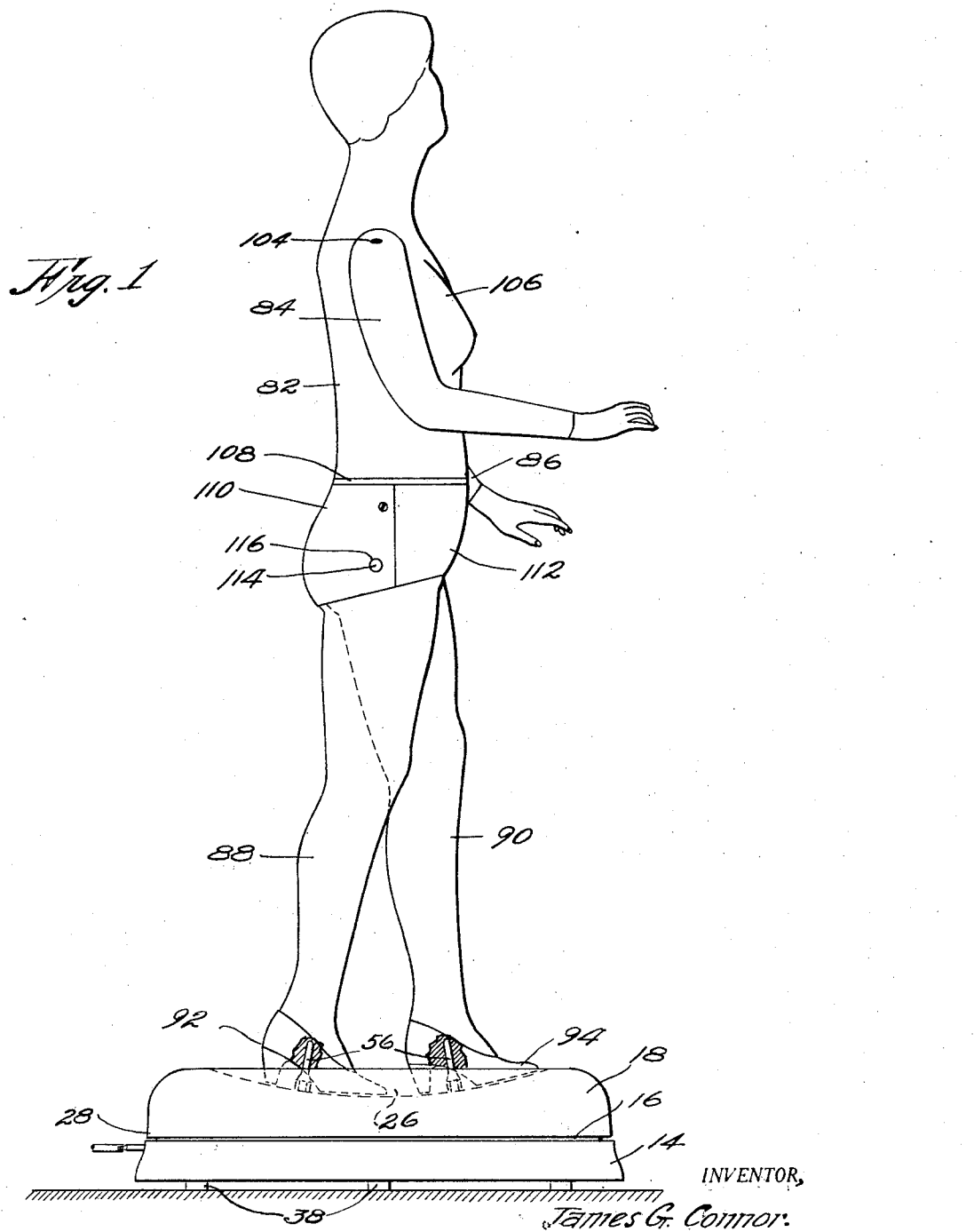
Figure 1 is a side elevation of a mechanical figure embodying this invention.
Figure 2:
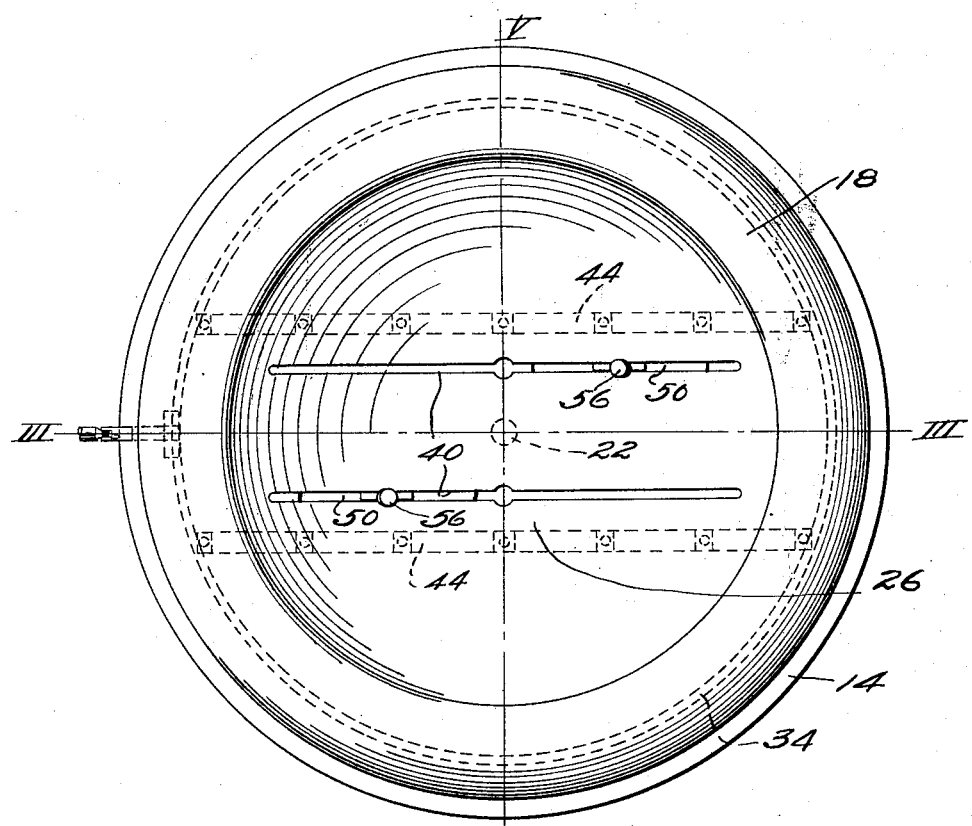
Fig. 2 is a plan view of the turntable with some of the concealed parts shown in dotted lines.
Figure 3:
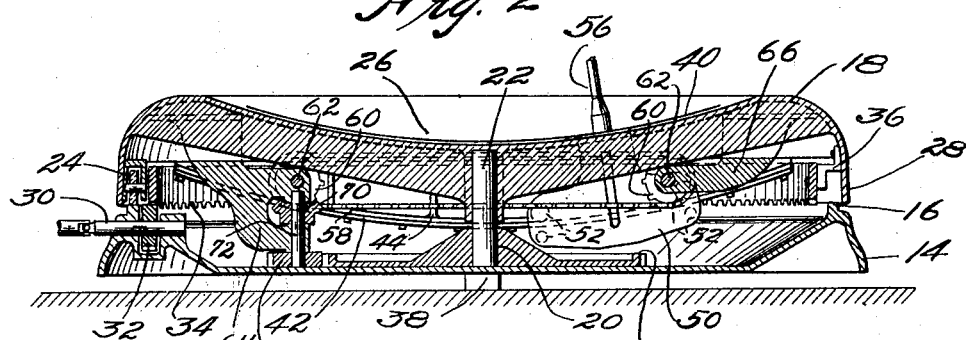
Fig. 3 is a vertical cross section of the turntable taken on line III—III of Fig. 2.
Figure 4:
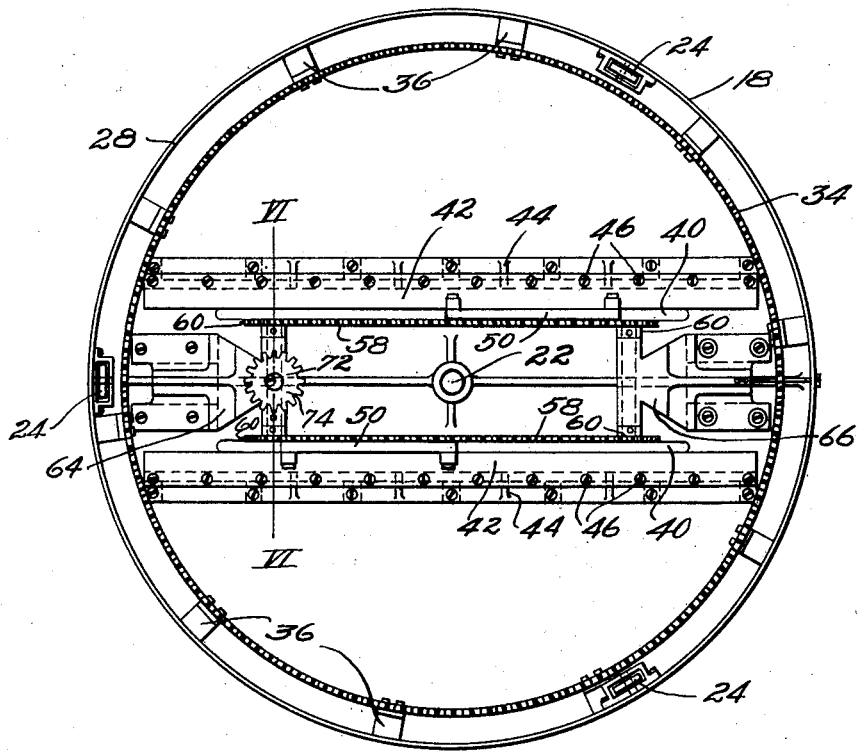
Fig. 4 is an inverted plan view of the top of the turntable.
Figure 5:
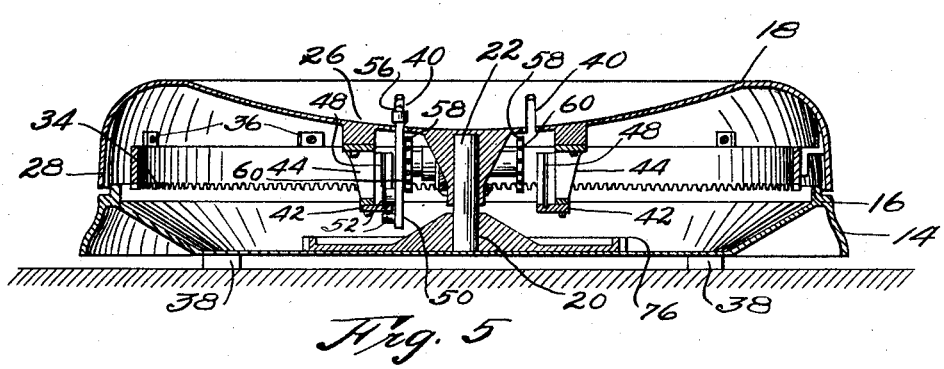
Fig. 5 is a sectional view of the turntable taken on line V—V of Fig. 2.

Like reference characters refer to similar parts throughout the several views and the numeral 14 designates the base of the turntable, having an upwardly extending peripherial flange 16 that serves as a track to support the top 18 of the turntable for rotation thereon. Axially disposed to said flange is a socket 20, formed in the base 14, adapted to receive an axially disposed pin 22, rigidly mounted in the top of the turntable to permit rotation of the top and maintain the rollers 24, which are carried by the top 18, in proper operative relation with the flange 16. The central portion 26 of top 18 is concave while its outer periphery is formed to present a downturned flange 28 which facilitates the housing of the parts and presents a pleasing connection with the base.

The base and top members of the turntable are shown as castings, but may be made of pressed sheet metal, or built up in any suitable manner to obtain the desired results.

Radially mounted for rotation in base 14 is a shaft 30 on which is axially affixed a spur pinion 32, which, when the shaft 30 is rotated by a suitable power unit, not shown, will drive the turntable top through the intermediacy of the ring gear 34, carried by the top, in such a manner as to mesh with the pinion.

To lessen the noise in operation the contacting driving parts may be made of non-metallic material, such as fiber, hard rubber, etc. Also, the spacing elements 36 which are interposed between the flange 28 and gear 34 may be so constructed as to absorb the vibration of the parts. Another provision for lessening the tendency of the moving parts to vibrate and produce objectional noise is a series of resilient supporting pads or feet 38, on which the turntable rests. To properly operate the members of the figure shown, it is desirable to provide reciprocating carriages to which the feet of the figure are secured to cause oscillation of the legs in opposite directions, to simulate to a certain degree of accuracy, a walking motion. During this walking motion it is also necessary that the torso be held against any appreciable vertical movement. To obtain these desired movements, and to eliminate the objectionable movements, the following construction of parts is provided.

Two arcuate slots 40 are formed in the concave face of the top 18, and are preferably in this instance in spaced parallel relation. However, they may, under certain circumstances, be disposed in angled relation. Positioned below, and in substantial concentric relation thereto, is an arcuate guide or track 42, carried by top 18 through the intermediacy of a webbed bracket 44 to which it is attached by screws 46. Each track 42 is provided with a longitudinal groove 48 for purposes hereinafter set forth.

A carriage 50 having a set of spaced apart rollers 52 adjacent each of its ends is adapted to extend through its adjacent slot 40 with the track 42 therebelow positioned between the rollers of said set in such a manner as to afford a movable support for the figure to be operated. For securing the rollers against transverse movement relative to the track a flange 54 is provided for one of each of the pair of rollers, which is adapted to enter the groove 48 as is clearly shown in Fig. 6. Each carriage 50 is provided with a removable stud 56 extending substantially radially to the line of movement.

This stud 56 is adapted to be secured in the foot of the figure, as hereinafter described.

The means for oscillating these carriages consists of an endless chain 58, carried on two spaced apart sprocket wheels 60 rigidly mounted on parallel shafts 62, which in turn are rotatably mounted in brackets 64 and 66 respectively, carried by top 18, as shown in Fig. 6. Shaft 62, carried in bracket 64, is provided with a mitre gear 68 which meshes with another mitre gear 70, which in turn is mounted on a vertically disposed shaft 72 also carried by bracket 64. A spur pinion 74 is rigidly attached to the lower end of shaft 72 and in operative relation with a spur gear 76, stationarily attached to base 14 concentrically with the axis of rotation of the turntable, so that as the turntable is rotated by the means above described, the pinion with its connecting parts will travel in a circle and the pinion 74 will at all times engage gear 76 and impart rotation to shaft 72, thereby rotating mitre gear 70, mitre gear 68, shaft 62, sprockets 60, and causing the chain 58 to travel at similar rates of speed. The rotative rates of speed of travel of the chains and turntable may be easily varied by changing the gear ratios.

Each carriage 50 is provided with a vertically disposed slot 78 of a sufficient length to extend above and below its adjacent chain 58 so that the roller 80, carried by said chain, may at all times be positioned in its respective slot 78 to drive the carriage back and forth at the same rate of travel as that of the chain. As that portion of the chain having the roller passes around the sprocket wheels 60, it is apparent that the direction of travel of the carriage will be reversed and the position of the roller in the slot will be changed. Furthermore, due to the arcuate form of the track which guides the carriage, an added relative movement of the roller in the slot is necessary. By changing the direction and shape of slots 72, variations in the movement of the carriages might be affected.

Should it be desired to change the degree of curvature of the track or the general shape thereof, it is apparent that movements other than that shown and described could be produced without materially altering the general structure shown.

The figure shown is that of a woman and consists in the main of a hollow torso 82, arms 84 and 86, and legs 88 and 90, terminating in feet 92 and 94 respectively. The arms 84 and 86 are rigidly mounted on shafts 96 and 98, respectively, which in turn are rotatably mounted in bearings 100, carried by the torso. Each shaft is provided with a rigidly attached lever for purposes hereinafter fully set forth. Shafts 96 and 98 are in alinement and a sleeve 102 is fitted over their adjacent ends to serve to maintain them in this position. To obtain different movements of the arms it is necessary that the angular relation of each arm to its respective operating lever must be adjustable, and it is for this purpose that the set screws 104 are provided. When the set screws are loosened the arms may be rotated on their respective shafts and the set screw again tightened to maintain them in a fixed relation.

The lower portion of the torso is preferably constructed of metal or some strong material suitable for carrying the operating parts of the body, while the upper parts thereof may be made of the usual composition material, such as is now in common use for such figures.

The upper portion 106 of the torso is cast or fitted to a plate 108, the underside of which is adapted to be rigidly attached to casting 110 which serves as the main supporting member for the mechanism hereinafter described and to form a part of the outer contour of the body. Removably fitted to 110 is a front plate or cover 112 which, removed, permits access to the working parts within the body.

Legs 88 and 90 are mounted on a common shaft 114 which is mounted in casting 110 at 116 and supported at its center portion by a bracket 118 which is also secured to 110. Each leg is provided with two perforated ears 120 through which the shaft 114 is passed to permit oscillation of the legs. Bracket 118 also serves as a spacer between adjacent ears of the two legs and with the member 110 maintains the legs against relative transverse movement.

Each foot is provided with a recess 122, into which is adapted to be fitted stud 56, so that as the studs are moved back and forth as above described, the legs will be oscillated in opposite directions. When the legs are so oscillated it is apparent that means must be provided whereby the body will maintain a substantially upright position regardless of the position of the legs, also to prevent an up and down movement of the torso it is necessary that the radial center of the arcuate track 42 should be approximately the center of the shaft 114. When it is desired to obtain an up and down movement of the body of the figure, it is only necessary to change this center or even make a straight track for the carriages.

One of the principal features of this invention is the novel and efficient means for maintaining the torso in a substantially upright position as the legs are being oscillated in opposite directions, which is clearly shown in Figs. 9, 10 and 11. Positioned above and parallel with shaft 114, and rotatably carried by bracket 118, is a shaft 124 which, when maintained in a fixed position relative to shaft 114, tends to maintain the torso in a predetermined vertical posture.

Pivotally attached at 130 to ear 126, integral with leg 90, is a longitudinally adjustable link 128 having its other end pivotally attached at 132 to the outer end of lever 134, which is securely affixed to shaft 124. Link 128 is so positioned and connected that it is substantially parallel at all times to a line perpendicular to the axis of shafts 114 and 124 and consists of two threaded head members 136, joined together by a differentially threaded rod 138. The threads on rod 138 are of different leads so that as the rod is rotated the pivotal members 130 and 132 will be forced to or from each other.

Leg 88 is operatively connected to shaft 124 through link 140 pivoted at one end by means of pivot 142 to ear 144, which is integral with leg 88. The other end of link 140 is pivoted at 146 to lever arm 148 that is securely mounted on shaft 124. The relation of the parts connecting the legs to the shaft 124 as just described is such that when the legs are moved in opposite directions at like speeds the shaft will be rotated through a like arc and the body will be maintained in a fixed position because the connecting parts for the legs and torso are so arranged as to cooperate to preclude movement of shaft 124 relative to shaft 114. By varying these connecting parts predetermined relative movements of the legs and torso may be obtained to get any desired effect.

The movements of the arms are obtained through the action of the legs by the following described means.

Shaft 150, positioned above shaft 114 and rotatably carried by bracket 118, is provided with a rigidly attached lever 152 and oppositely disposed levers 154 and 156 which are pivotally connected, respectively, with the connecting rods 158 and 160. The upper end of rod 158 is formed as at 162 to hingedly engage the outer end of lever 164 which is securely attached to shaft 96. Also, rod 160 is provided with an angled portion 166 at its upper end which serves to operably engage the outer end of lever 168, rigidly mounted on shaft 98.

These levers and connecting rods are so connected that when shaft 150 is oscillated through means hereinafter described arms 84 and 86 will be simultaneously moved in opposite directions and through arcs determinable by the position of each arm on its respective supporting shaft. Furthermore, the threaded portions 170 of rods 158 and 160 permit of an adjustment to the length of the rods which will also vary the strokes of the arms.

For varying the degree of oscillation of shaft 150 and thereby controlling the movement of the arms, the following mechanism is provided. Pivotally mounted at 172 in leg 90 below the pivotal point thereof is a lever arm 174, having a head 176 which extends above shaft 114. To head 176 is pivotally attached an adjustable link 178, having its other end pivotally connected at 180 to lever 152. Since the distance of travel of head 176 is dependent upon its distance from shaft 114, means is provided whereby this head is positioned at any desired location relative thereto. This means consists of a lug 182 pivotally mounted at 184 on lever 174 and having a threaded opening 186, into which is operatively fitted an adjusting bolt 188. This bolt is mounted in a recess 190, formed in leg 90, in such a manner that the operator may have ready access thereto when it is desired to change the movement of the arms.

While only one form of the present invention has been shown and described, yet it is apparent that many modified forms may be made without departing from the spirit of the appended claims.

What I claim is:

1. A mechanical figure comprising a torso; arms pivotally carried by said torso; legs pivotally mounted on said torso; a turntable having carriage adapted to serve to support said figure; means to rotate said turntable; means operable, as said turntable is rotated to oscillate said legs in opposite directions and relative to said torso; and means actuated by one of said legs to move said arms in opposite directions.

2. A mechanical figure comprising a turntable having tracks carried thereby and rotatable therewith; carriages movably mounted on said tracks; means, operable as said turntable is rotated, to move said carriages in opposite directions on said tracks; a torso; limbs pivotally mounted on said torso with their respective lower portions thereof securely attached to separate carriages respectively, whereby when said carriages are moved said legs will move relative to said torso; and two spaced apart substantially parallel shafts carried by said torso, interconnected with said legs to maintain said torso against oscillation as the legs are moved.

3. A mechanical figure comprising a torso; legs pivotally mounted on said torso on a common shaft; means for oscillating said legs simultaneously in opposite directions; a shaft having levers affixed thereto mounted for rotation in said torso above and substantially parallel with said common shaft; a link connecting one of said levers to one of said legs; a link connecting another of said levers to another of said legs; the connection between said levers and legs being such as to cause said lever carrying shaft to oscillate in the same direction as the connected legs oscillated in opposite directions.

4. A mechanical figure comprising a torso; legs pivotally mounted on said torso on a common shaft; means for oscillating said legs simultaneously in opposite directions; a shaft having levers affixed thereto mounted for rotation in said torso apart from and substantially parallel with said common shaft; a link connecting one of said levers to one of said legs; a link connecting another of said levers to another of said legs; the connections between said legs and levers being so positioned as to cause said lever carrying shaft to rotate in like arcs and in the same direction as the legs are oscillated in opposite directions.

5. A mechanical figure comprising a torso; legs pivotally mounted on said torso on a common shaft; means for oscillating said legs simultaneously in opposite directions; a shaft having levers affixed thereto mounted for rotation in said torso apart from and substantially parallel with said common shaft; a link connecting one of said levers to one of said legs; a link connecting another of said levers to another of said legs; the connections between said legs and levers being so positioned as to cause the lever carrying shaft and the common shaft to maintain a substantially fixed position relative to a horizontal plane.

6. A mechanical figure comprising a torso; legs pivotally mounted on said torso on a common shaft; means for oscillating said legs simultaneously in opposite directions; a shaft having levers affixed thereto mounted for rotation in said torso apart from and substantially parallel with said common shaft; a link connecting one of said levers to one of said legs; a link connecting another of said levers to another of said legs; the connections between said legs and levers being so positioned as to preclude oscillatory movement of said lever carrying shaft about said common shaft as the legs are oscillated in opposite directions.

In testimony whereof, I hereunto affix my signature.

JAMES G. CONNOR.